United States Patent [19]

May

[11] Patent Number: 4,620,814

[45] Date of Patent: Nov. 4, 1986

[54] DEVICE WITH DISTORTABLE OPENING-DEFINING PORTION

[76] Inventor: Jim May, 12110 SE. Pine, Portland, Oreg. 97216

[21] Appl. No.: 608,723

[22] Filed: May 10, 1984

Related U.S. Application Data

[63] Continuation-in-part of Ser. No. 544,530, Oct. 24, 1983, abandoned.

[51] Int. Cl.$^4$ .......................... F16B 2/02; F16D 1/00
[52] U.S. Cl. ................................ 403/314; 403/366; 403/370; 403/372; 403/374
[58] Field of Search ............... 403/309, 314, 366, 362, 403/370, 371, 372, 374, 302, 289, 290

[56] References Cited

U.S. PATENT DOCUMENTS

| | | | |
|---|---|---|---|
| 126,183 | 4/1872 | Charlton | 403/309 |
| 245,696 | 8/1881 | Black . | |
| 284,704 | 9/1883 | Zschech | 403/314 |
| 288,746 | 11/1883 | Vielhaber | 403/314 |
| 317,695 | 5/1885 | Yocom, Jr. | 403/314 |
| 691,448 | 1/1902 | Cowell | 403/309 |
| 745,690 | 12/1903 | Thompson | 403/314 |
| 820,037 | 5/1906 | Canda | 403/314 |
| 992,352 | 5/1911 | Hansler . | |
| 1,758,182 | 5/1930 | Strong | 403/370 |
| 3,023,034 | 2/1962 | Chung . | |
| 3,460,847 | 8/1969 | Hohwart et al. . | |
| 3,682,505 | 8/1972 | Firth | 403/371 X |
| 3,851,977 | 12/1974 | Boole | 403/370 X |
| 4,372,703 | 2/1983 | Szostak | 403/376 |

FOREIGN PATENT DOCUMENTS 2054799 2/1981 United Kingdom ............... 403/372

Primary Examiner—Cornelius J. Husar
Assistant Examiner—Todd G. Williams
Attorney, Agent, or Firm—Eugene M. Eckelman

[57] ABSTRACT

A body portion of a device has an opening for receiving an engaging member and a portion of the body portion defining the opening is distortable into the opening. A wedge is provided in a tapered bore in the body portion adjacent the distortable defining portion and is arranged to distort the latter into engagement against an engaging member. The distortable portion comprises a tab formed by areas of removed material provided between the opening and the tapered bore.

3 Claims, 8 Drawing Figures

DEVICE WITH DISTORTABLE OPENING-DEFINING PORTION

REFERENCE TO PRIOR APPLICATIONS

This application is a continuation-in-part of application Ser. No. 544,530, filed Oct. 24, 1983 now abandoned.

BACKGROUND OF THE INVENTION

This invention relates to new and useful improvements in devices of the type arranged to be mounted on shafts or the like and more particularly relates to such devices that have distortable opening-defining portions for locking them on their support or for providing a selected tolerance therewith.

Pulleys, gears or other items are generally secured on shafts for rotation with the shaft by keyway assemblies and usually are anchored laterally on the shaft by set screws or other means. In some instances, the pulleys or gears are confined between collars or other members anchored to the shaft or forming a part of frame support. In assemblies using set screws, the driving forces on pulleys or gears rapidly wear at the set screws, the driving forces on pulleys or gears rapidly wear at the set screw engagement, particularly where back and forth driving forces are imparted, and thus the pulley or gear develops play on the shaft. After a certain amount of wear has taken place, it is necessary to replace the pulley and also it may in some cases be necessary to replace the shaft, such as when the shaft is a part of a gear box or the like. This type of maintenance is expensive, particularly in down time of the machinery.

These prior structures thus are expensive to maintain, and in those instances where a pulley or gear is confined axially by set screw collars, the use of such collars obviously adds to the cost of the assembly. The use of set screws in pulleys or gears, or in confining collars therefor, also damage the shaft to some extent and this of course has obvious disadvantages.

SUMMARY OF THE INVENTION

According to the present invention and forming a primary objective thereof, a device of the type having an opening therein is provided with a portion which is expandable into said opening by distortion for frictionally engaging a shaft or reducing the tolerance between the device and a member disposed in the opening.

Another object is to provide a device of the type described that has engagement with a member in the opening which is long lasting and which does not damage the member.

In carrying out the objectives of the invention, the device has a body portion with an opening or aperture for receiving a shaft or other member. A defining portion of the opening is distortable into the opening, and wedge means are provided in the body portion adjacent the distortable defining portion whereby upon tightening of the wedge means the resulting distortion is capable of providing a frictional locking engagement on the member or a closer tolerance. In a preferred structure, the wedge means comprises a bore and a pin threadedly engaged in the body portion having a tapered head arranged to engage the tapered bore to provide a distortion of the defining portion of the opening upon tightening the pin. The wedge means may be provided at one end only of the hub or in alternative structure, such wedge means may be provided on both ends. Also, more than one of the wedge means may be provided on one or both ends.

The invention will be better understood and additional objects and advantages will become apparent from the following description taken in connection with the accompanying drawings.

DETAILED DESCRIPTION OF PREFERRED EMBODIMENTS

Figure 1:
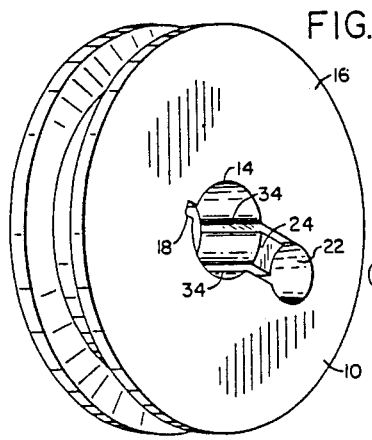
FIG. 1 is a perspective exploded view showing a pulley structure embodying one form of the present invention.
Figure 2:
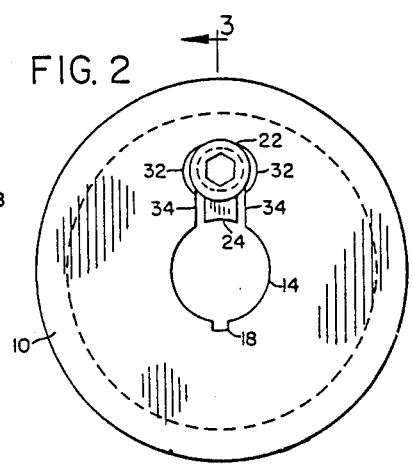
FIG. 2 is a face view of the pulley taken from the right side of FIG. 1.
Figure 4:
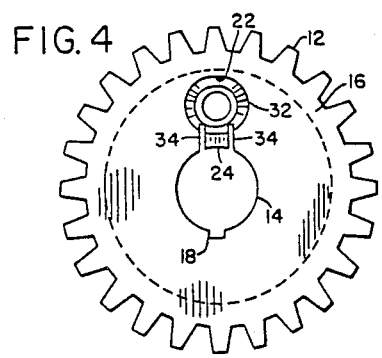
FIG. 4 is a view similar to FIG. 3 but showing application of the invention to a gear.

The present invention is applicable to substantially any type of device having an opening and being engageable with a member disposed in the opening. As an example, FIG. 1 shows the invention as applied to a pulley 10 and FIG. 4 shows the invention as applied to a gear wheel 12. In each instance, the hub portion has an opening 14 extending between opposite ends 16, such opening being arranged to receive a shaft, not shown. In most instances, opening 14 has a key slot 18 arranged to receive a key, not shown, in a key and slot assembly connection with the shaft.

Figure 3:
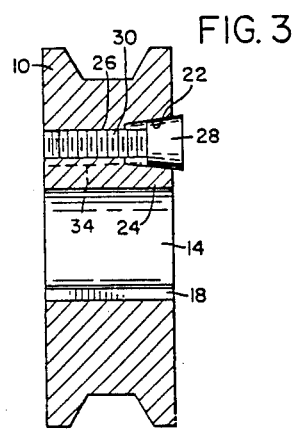
FIG. 3 is a sectional view taken on the line 3—3 of FIG. 2.

According to a first form of the invention, a bore 22 is provided in one end which extends substantially parallel with the axis of the opening 14. The defining wall of this bore is disposed closely to but spaced from the defining surface of opening 14 so as to provide a layer of material 24 between the bore 22 and opening 14. Bore 22 is tapered to a lesser diameter toward the bottom or inner end thereof and communicates with a tapped bore 26. Tapered bore 22 is arranged to receive the tapered head 28 of a screw 30 threadedly engaged with the tapped bore 26. Tapered head 28 is of an enlarged dimension relative to the tapered bore 22 such that this head has wedging engagement in such bore, as best apparent in FIG. 3. The tapered contour of the bore 22 intersects a radius of the hub whereby the wedging action of the head 28 operates in a radial direction. The sides of the bore 22, designated by the numeral 32, are cut away to form an oval-shaped bore whereby inward threading movement of the screw 30 allows its head 28 to advance sufficiently to provide the radial wedging function.

A pair of grooves 34 extend inward from the end of the hub in which the tapered bore 22 is provided, and these grooves open through a part of their length into both the opening 14 and the bore 22. The grooves 34 terminate short of the bore 26, and the layer 24 of material defined by the two grooves 34 as well as by the surfaces of opening 14 and tapered bore 22 forms a tab, connected to the hub by the material between the bottom of grooves 34 and bore 26. The tab can be distorted radially in the direction of opening 14 by wedging action of the tapered head 28 in the groove 22. That is, upon tightening the screw 30, its head 28 will bend the tab 24 in a straight radial direction against a shaft or other member which supports the hub, and by substantial heavy threading pressure of the screw in the tapped bore 26, a firm frictional engagement of the tab 24 is provided against the shaft.

Grooves 34 can extend fully from end to end of the hub for ease of manufacture but for purposes of the invention, it is only necessary that they be long enough to open into both the opening 14 and bore 22 adjacent an end of the hub so as to form the tab 24.

The wedging angle of the tapered bore 22 may vary. A representative angle is approximately five degrees, although a lesser or greater angle can be used if desired to provide a greater or lesser leverage of wedging action.

Figure 5:
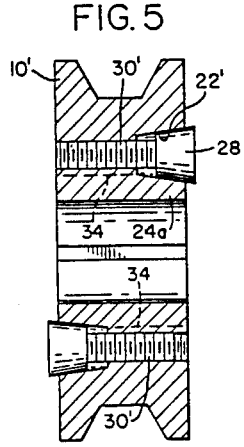
FIG. 5 is a sectional view similar to FIG. 3 but showing double wedge means.

FIG. 5 shows an alternative form of the invention comprising a pulley 10' having a screw 30' of the invention mounted in tapered bores 22' in each end so as to provide a double frictional locking engagement with the shaft, namely, such structure employs a tab 24a adjacent each end. The operation of the wedging heads 28' is identical to that described in connection with previous figures. The locking tabs 24a can have various positioning in the opposite ends, such as diametrical as shown, or other positioning as desired. Also, more than one of the tabs 24a may be provided on each end.

Figure 6:
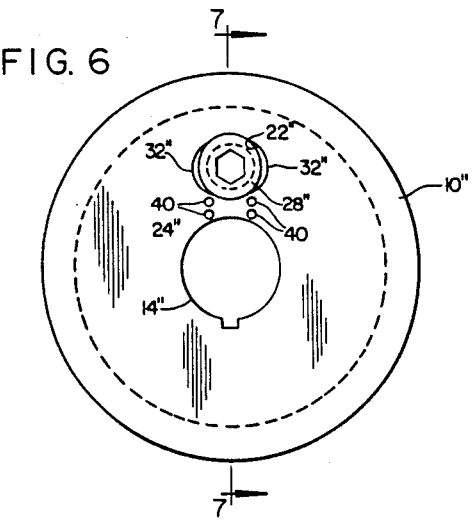
FIG. 6 is a face view of a pulley embodying another form of the invention.
Figure 7:
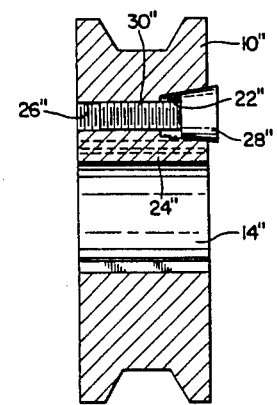
FIG. 7 is a sectional view taken on the line 7—7 of FIG. 6.

FIGS. 6 and 7 show a further variation of the invention. A pulley 10", similar to the earlier embodiments, has a bore 22" provided in one end in parallel relation to the opening 14" through the pulley and this tapered bore communicates with a tapped bore 26". Bore 22" is arranged to receive the tapered head 28" of a screw 30" threadedly engaged with the tapped bore 26". The tapered head 28" is arranged to provide wedging engagement in its bore, and to provide a connected but distortable tab 24" drilled holes 40 extend inward from the end of the hub in which the tapered bore 22" is provided. These bores do not necessarily extend all the way through the pulley but preferably extend at least halfway through. Such bores are provided on each side of the radial center between the opening 14" and the tapered head 28" and are provided in size and number sufficient to allow the tapered head in its wedging engagement to distort the tab 24" into the opening 14". The sides of the bore 22" are cut away at 32" to allow the tapered head to provide its wedging function.

In the structure of FIGS. 6 and 7, the tab defining portions do not open into the opening 14" and thus there is minimum chance of damage to the member which is received in the opening 14". Also, the drilled holes 40 are readily provided by a drill press.

Figure 8:
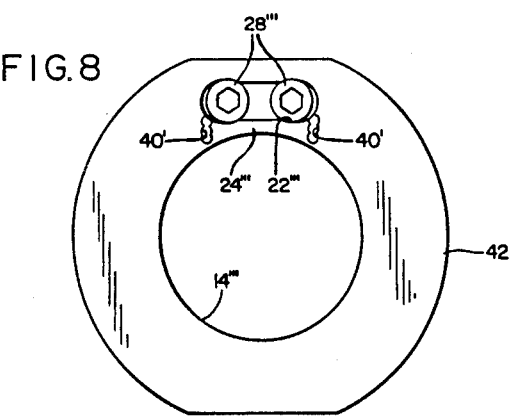
FIG. 8 is a face view of a collar showing an alternative structure of the form of the invention shown in FIGS. 6 and 7.

FIG. 8 illustrates an embodiment similar to that of FIGS. 6 and 7 except that the invention is applied to a collar instead of a pulley. Also, two pins are threadedly mounted in the body portion instead of one and have tapered heads 28'" disposed in a widened bore 22'". Similar to the embodiment of FIGS. 6 and 7, a plurality of drilled holes 40' are provided in the area between the bore 22'" and the central opening 14'" of the collar to provide the connected but distortable tab 24'". As apparent in FIGS. 6 and 7, the drilled holes 40 may be spaced from each other or as shown in FIG. 8 such holes may intersect each other to form a groove terminating short of the opening 14'".

In the use of the present invention, a firm frictional locking engagement or adjustable tolerance can be provided between two members, and since there is a large surface engagement, a secured anchor connection or predetermined tolerance is made and furthermore no appreciable damage is done to the member in the opening. The side accessible screw head permits easy access for installing and removing a pulley or gear on a shaft or for adjusting tolerance.

It is to be understood that the forms of my invention herein shown and described are to be taken as preferred examples of the same and that various other changes in the shape, size and arrangement of parts may be resorted to without departing from the spirit of my invention, or the scope of the subjoined claims. For example, the wedge means 28 may take forms other than a screw, namely, it could be merely a tapered pin, headed or not, having a friction fit in a tapered bore. Also, the tab 24 can be of varying thicknesses depending upon the flexibility thereof that is desired.

Having thus described my invention, I claim:

1. A device arranged for connected engagement with an associated member comprising a body portion having opposite ends and a first bore therethrough arranged to receive an associated member, a second bore in said body portion extending in from one end in a direction parallel with said first bore but spaced radially therefrom to provide a layer of material between said first and second bores which is integral with said body portion, a pair of openings in said body member disposed between said first and second bores and extending parallel to said bores, said pair of openings being spaced laterally from each other to form a tab in said layer of material, said tab being defined between said pair of openings and between said first and second bores and being capable of distortion toward said first bore in a straight radial direction, and wedge means in said second bore adjacent said tab arranged when forced in from said one end to distort said tab radially into said first bore and into surface engagement with an associated member in said first bore, said second bore comprises at least one uniform diameter tapped bore and at least one enlarged tapered untapped portion at said one end, said wedge means comprising at least one screw having a uniform diameter threaded shank portion engageable with said tapped bore and an elongated tapered head portion slidably engageable with said untapped portion of said second bore, whereby inward threaded movement of said screw distorts said tab inwardly for engagement with an associated member.

2. The device of claim 1 wherein said pair of openings each comprises one or more drilled holes leading inwardly from said one end.

3. The device of claim 1 wherein said untapped portion of said second bore has lateral extensions to provide wedging clearance of said tapered head in said second bore.

* * * * *